April 6, 1926.                    1,580,100
J. GRANT ET AL
FRICTION GRIP CLAMP
Filed March 18, 1925
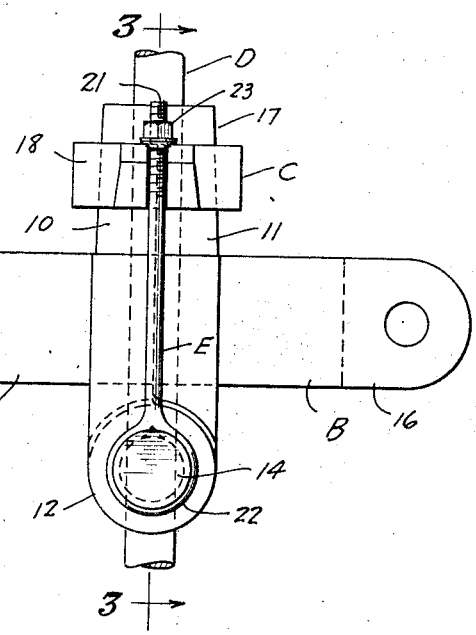
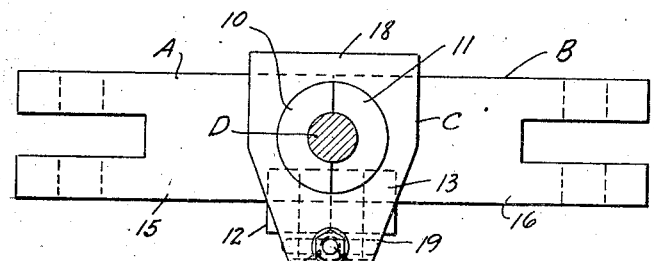
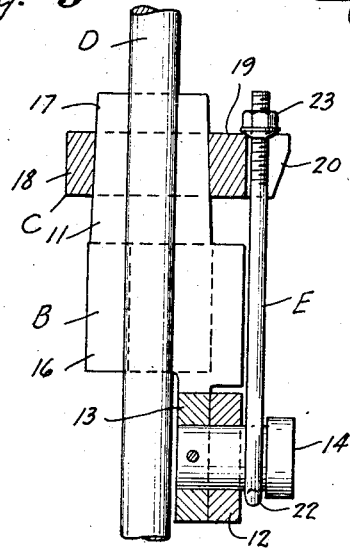
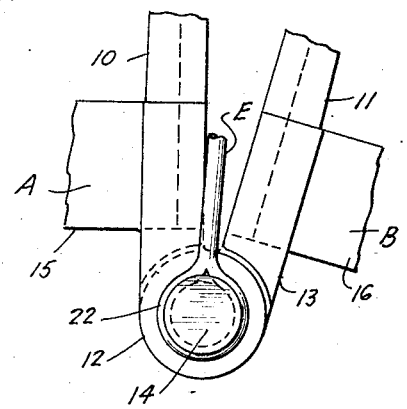
INVENTOR.
John Grant
BY Stewart L. Campbell
Nestall and Wallace
ATTORNEYS.

Patented Apr. 6, 1926.

1,580,100

UNITED STATES PATENT OFFICE.

JOHN GRANT, OF LOS ANGELES, AND STEWART L. CAMPBELL, OF BERKELEY, CALIFORNIA; SAID CAMPBELL ASSIGNOR TO SAID GRANT.

FRICTION-GRIP CLAMP.

Application filed March 18, 1925. Serial No. 16,427.

*To all whom it may concern:*

Be it known that we, JOHN GRANT and STEWART L. CAMPBELL, citizens of the United States, and residing at Los Angeles, county of Los Angeles, and State of California, and Berkeley, county of Alameda, State of California, respectively, have invented new and useful Improvements in a Friction-Grip Clamp, of which the following is a specification.

This invention relates to a clamp for rods, pipe, cables and like work. More specifically, the present invention pertains to a friction clamp which may be firmly attached to the work at any place intermediate its ends. The objects of this invention are, first, to provide a clamp which is economical to manufacture, strong, durable, and will not injure or mar the work to which it is applied; and second, to provide a clamp structure which can be easily and readily attached to and detached from the work.

These objects are accomplished by means of the embodiment of our invention illustrated in the accompanying drawing, in which:

Fig. 1 is a side elevation of a clamp especially adapted for application to polish rods used in oil well pumping apparatus; Fig. 2 is a plan view of the structure shown in Fig. 1; Fig. 3 is a section as seen on the line 3—3 of Fig. 1; Fig. 4 is a front elevation of a fragment of the clamp showing the collar in open position.

Referring more particularly to the drawing, and especially Figs. 1 to 4, inclusive, the clamp comprises similar jaws A and B pivotally secured to one another so as to form a split collar. A locking ring C for holding the jaws against the work is provided, the work being a rod D. A retaining bar E maintains the ring in position.

The clamp collar comprises a split tubular shell, the sections being indicated by 10 and 11. On the sections are hinge extensions 12 and 13 ending in eyes in which a hinge pin 14 is disposed. The head of the hinge pin is spaced from the eye on extension 12 to provide a space for receiving the ring retaining member E. Extending laterally from the section of the tubular portions of the clamp are arms 15 and 16 having openings at the end arranged for attachment thereto of the suspension tackle. The upper portion of the collar is tapered as indicated by 17.

The ring C comprises a body 18 having a bore tapered to correspond to the external taper on the collar. There is a projection 19 which is slotted as indicated by 20. This slot is arranged to receive the retaining rod E which is threaded at the free end 21 and has an eye 22 through which the hinge pin 14 extends. There is enough clearance between the eye 22, the hinge eye 12 of jaw 11, and the head of the hinge pin to permit the retaining rod to be swung into and out of the slot 20. A nut 23 is threaded upon the end of the rod.

The clamp is applied to the work in the following manner: Ring C is removed from the collar, and sections 10 and 11 swung outwardly opening the clamp. Ring C is then placed over the work such as a polish rod D, the clamp is placed so that the collar jaws embrace the work and then are brought together and the ring C slipped over the tapered end of the collar. The ring is then wedged or forced downwardly over the tapered portion so as to press the jaws firmly against the work. Striking the ring with a hammer will aid in firmly securing the ring in position. By this means the jaws are given a strong frictional engagement with the work. The degree of taper on the tubular portion of the jaws is such that the ring 18 will normally maintain itself in position and cannot be displaced. However, to avoid displacement we have provided retaining rod E. The rod is moved upwardly and placed within the slot 20 and the nut 23 is then screwed upon the end of the rod until it engages the projection 19. It is not necessary to bring great pressure to bear upon the ring by means of the retaining rod, as it is not the purpose of the latter to force the ring into position, but only to retain the same. The reverse of the operation just described is performed to remove the clamp from the work.

What we claim is:

1. A clamp comprising a longitudinally divided shell provided with a bore to grip the work and having a tapered ring receiving portion, said shell being provided with suspension tackle attachment means at the sides, and a locking ring for mounting on said tapered portion so that it can be wedged thereon.

2. A clamp comprising a longitudinally divided collar to grip the work having a tapered ring receiving portion, the sections of said collar being hinged so as to be swung open, said collar being provided with suspension tackle arms extending therefrom, transverse to the axis of the bore of said collar, and a locking ring for mounting on said tapered portion so that it may be wedged thereon.

3. A clamp comprising a longitudinally divided collar to grip the work having a tapered ring receiving portion, the sections of said collar being hinged so as to be swung open, suspension tackle arms extending from said collar, a locking ring for mounting on said tapered portion so that it may be wedged thereon, and a tie rod secured to said collar and arranged to be attached to said ring whereby to retain the latter in position on said collar.

In witness that I claim the foregoing I have hereunto subscribed my name this 5th day of March, 1925.

JOHN GRANT.

In witness that I claim the foregoing I have hereunto subscribed my name this 10th day of March, 1925.

STEWART L. CAMPBELL.